United States Patent
Brown et al.

(10) Patent No.: US 8,168,108 B2
(45) Date of Patent: May 1, 2012

(54) MOLDING APPARATUS AND METHOD OF FORMING UNDERCUTS

(75) Inventors: Dean Brown, Beaverton, MI (US);
Terry Vovan, Upland, CA (US)

(73) Assignee: Pactiv LLC, Lake Forest, IL (US)

( * ) Notice: Subject to any disclaimer, the term of this patent is extended or adjusted under 35 U.S.C. 154(b) by 0 days.

(21) Appl. No.: 12/916,171

(22) Filed: Oct. 29, 2010

(65) Prior Publication Data
US 2011/0042851 A1 Feb. 24, 2011

Related U.S. Application Data

(62) Division of application No. 11/949,658, filed on Dec. 3, 2007, now Pat. No. 7,845,932.

(51) Int. Cl.
*B29C 45/33* (2006.01)
*B29C 45/44* (2006.01)

(52) U.S. Cl. .. 264/318; 264/334; 425/442; 425/DIG. 58

(58) Field of Classification Search .......... 425/394, 425/403, 403.1, 438, 441, 442, 443, DIG. 584, 425/556, 577, DIG. 5, DIG. 58; 264/318, 264/334
See application file for complete search history.

(56) References Cited

U.S. PATENT DOCUMENTS

| | | | |
|---|---|---|---|
| 4,005,101 A | | 1/1977 | Ruch |
| 4,570,897 A | | 2/1986 | Von Holdt |
| 4,627,810 A | * | 12/1986 | Von Holdt ............ 425/577 |
| 4,822,553 A | * | 4/1989 | Marshall ............ 264/292 |
| 5,217,731 A | * | 6/1993 | Fallent ............ 425/556 |
| 5,766,536 A | * | 6/1998 | Felder ............ 264/297.1 |
| 7,033,536 B2 | * | 4/2006 | Martin ............ 264/549 |
| 2003/0189274 A1 | | 10/2003 | Graham et al. |
| 2004/0113329 A1 | * | 6/2004 | Martin ............ 264/547 |
| 2004/0222559 A1 | | 11/2004 | Gomes et al. |
| 2006/0018994 A1 | | 1/2006 | Schwaiger et al. |
| 2007/0052135 A1 | * | 3/2007 | Habeger ............ 264/318 |

FOREIGN PATENT DOCUMENTS

| | | |
|---|---|---|
| JP | 03 222708 | 10/1991 |
| JP | 11 000924 | 1/1999 |

OTHER PUBLICATIONS

Extended European Search Report in EP08169826.8 dated Apr. 3, 2009.
U.S. Appl. No. 11/949,658, filed Jun. 19, 2009—Requirement for Restriction/Election.
U.S. Appl. No. 11/949,658, filed Jul. 9, 2009—Response to Election/Restriction.
U.S. Appl. No. 11/949,658, filed Sep. 29, 2009—Non-Final Office Action.

(Continued)

*Primary Examiner* — Yogendra Gupta
*Assistant Examiner* — Emmanuel S Luk
(74) *Attorney, Agent, or Firm* — Baker Botts LLP

(57) ABSTRACT

A molding apparatus can include a primary mold, a stripper, and a swinging member. The swinging member can comprise a molding surface defining an undercut portion of a molded item. The swinging member can directly contact or attached to the stripper and the primary mold. To facilitate removal of a molded item, the swinging member can withdraw through a hole in the primary mold as a direct result of a motion of the stripper to pull the molded item off the primary mold. The molded item can then be easily removed.

23 Claims, 11 Drawing Sheets

OTHER PUBLICATIONS

U.S. Appl. No. 11/949,658, filed Jan. 29, 2010—Response to Non-Final Office Action.
U.S. Appl. No. 11/949,658, filed Apr. 8, 2010—Final Office Action.
U.S. Appl. No. 11/949,658, filed Jul. 8, 2010—Response to Final Office Action / Amendment After Final.
U.S. Appl. No. 11/949,658, filed Jul. 27, 2010—Notice of Allowance.
U.S. Appl. No. 11/949,658, filed Oct. 27, 2010—Issue Fee Payment.
U.S. Appl. No. 11/949,658, filed Nov. 17, 2010—Issue Notification.

* cited by examiner

MOLDING APPARATUS AND METHOD OF FORMING UNDERCUTS

CROSS REFERENCE TO RELATED APPLICATIONS

This application is a Divisional of application Ser. No. 11/949,658, filed Dec. 3, 2007 now U.S. Pat. No. 7,845,932, the entire content of which is incorporated herein by reference.

BACKGROUND

1. Field

The embodiments and inventions described herein relate to molding. In particular, described embodiments relate to undercuts that can be made or facilitated in a molding process.

2. Description of the Related Art

Molding technology is used to form items in a wide variety of shapes, sizes, and materials. However, the geometry of certain items limits the speed of prior art molding technology. Molds can be expensive to manufacture. Thus, durability and reusability is a highly advantageous characteristic of molds. Many existing molds are not sufficiently deformable and rugged.

SUMMARY

In accordance with some embodiments of this invention, a molding apparatus comprises a primary mold, a stripper, and at least one swinging member. The primary mold can comprise at least one hole and be configured to define a portion of the surface of a molded item. The stripper can be positioned alongside the primary mold and comprise a stripping section and a receiving surface configured to receive one swinging member. The at least one swinging member can be connected to the primary mold at a pivot and comprise a molding surface that fits through the hole defined by the primary mold to define an undercut portion of the surface of the molded item. The swinging member can further comprise a contact feature configured to contact the receiving surface of the stripper such that when the stripper moves to strip the molded item, the stripper contacts the contact feature, causes the swinging member to rotate about the pivot, and thus causes the molding surface of the swinging member to move from a position protruding through the hole defined by the primary mold to a position not protruding through the hole defined by the primary mold.

In some embodiments the contact feature can comprise a roller and/or a slider. The contact feature can be configured such that when the stripper moves back after stripping the molded item the swinging member rotates back and the molding surface of the swinging member protrudes through a hole defined by the primary mold.

In some embodiments, a molding apparatus can comprise a primary mold, a stripper, at least one swinging member, and a coupling feature. The primary mold can be configured to determine the shape of a portion of the surface of a molded item and comprise at least one hole. The stripper can be located alongside the primary mold and comprise a stripping section. The at least one swinging member can comprise a molding surface configured to determine the shape of a portion of the surface of the molded item and to reversibly penetrate the hole in the primary mold. The coupling feature can be configured to couple the swinging member to the stripper such that the molding surface of the swinging member is moveable from a position extending through the at least one hole to a position not extending through the at least one hole defined by the primary mold.

In some embodiments the swinging member and the coupling feature can be configured to cause the molding surface of the swinging member to penetrate the hole defined by the primary mold when the stripper moves to remove the molded item from the primary mold. In some embodiment the swinging member can be connected to the primary mold and in contact with the stripper.

In some embodiments the molding apparatus can comprise no electronic elements. In some embodiments the molding apparatus can further comprise a heat sink.

In some embodiments, a molding apparatus comprises a primary mold, a deployable stripper, and at least one swinging member. The primary mold can comprise a shaped surface configured to receive moldable material, the shaped surface having a hole therein. The deployable stripper can be configured to strip the moldable material from the primary mold when deployed and subsequently return to a non-deployed position. The at least one swinging member can be located generally between the primary mold and the deployable stripper and have an extension portion. The extension portion can be configured to extend through the hole in the shaped surface of the primary mold to form an undercut in the moldable material when the deployable stripper is in the non-deployed position. The extension portion can be further configured to withdraw from the hole in the shaped surface of the primary mold when the deployable stripper is deployed.

In some embodiments, the hole in the primary mold can be large enough to leave a gas release gap between the extension portion and the edge of the hole, even when the extension portion is extending through the hole in the primary mold.

In some embodiments, a method of molding undercuts comprises providing a molding apparatus with at least one reversibly protruding member. Molding material can then be inserted into the molding apparatus. If necessary, the molding material can be allowed to set while the protruding member protrudes into the material. Then, in response to one movement, the protruding member can be withdrawn and simultaneously the molded item can be removed from the molding apparatus.

In some embodiments the reversibly protruding member can protrude when the molding material is inserted into the molding apparatus. In other embodiments the reversibly protruding member does not protrude when the molding material is inserted into the molding apparatus.

In some embodiments, the molded item can be removed from the molding apparatus. In some embodiments a set of molded items can be removed from the molding apparatus that have been formed from a single sheet of plastic. The set of multiple molded items can be cut into separate the products from each other before or after removal from the molding apparatus.

In some embodiments, the method can be repeated a plurality of times. In some embodiments the molded item can be removed by providing a high pressure between the molded item and the molding apparatus.

In some embodiments, the single movement can be the movement of a stripper. In some embodiments the movement of the stripper can directly cause the movement of the reversibly protruding member.

BRIEF DESCRIPTION OF THE DRAWINGS

The following drawings and the associated descriptions are provided to illustrate embodiments of the present disclosure and do not limit the scope of the claims.

DETAILED DESCRIPTION OF PREFERRED EMBODIMENTS

Although certain preferred embodiments and examples are disclosed below, inventive subject matter extends beyond the specifically disclosed embodiments to other alternative embodiments and/or uses of the invention, and to modifications and equivalents thereof. Thus, the scope of the inventions herein disclosed is not limited by any of the particular embodiments described below. For example, in any method or process disclosed herein, the acts or steps of the method or process may be performed in any suitable sequence and are not necessarily limited to any particular disclosed sequence. For purposes of contrasting various embodiments with the prior art, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

Creating a mold can involve a relatively large initial cost, followed by a low marginal cost during use. Molding technology is often used to produce high volumes of a product, thus recovering any large initial costs over time. Thus, a mold that is durable and reusable is valuable. To reduce the number of expensive molds that are manufactured to achieve a given total output, the ability of a single molding unit to form items at a high speed is a desirable characteristic.

The geometry of certain items limits the speed at which molded items can be manufactured using existing molding technology. For example, undercuts in the molded item complicate the molding process by requiring a protruding molding piece that prevents removal of said molded item until the protruding molding piece is withdrawn. This additional step increases the turn-around time between completion of one molded item and beginning to mold a second, and thus reduces output per machine.

Additionally, undercuts in the formed item require larger and more expensive molding equipment. Some processes may require separate mechanisms for removing the protruding mold piece and for removing the molded item. Combining these processes into a single mechanism reduces the size and cost of molding equipment, while also increasing speed and reliability.

To overcome limitations described above, and to overcome limitations that will become apparent upon reviewing this detailed description, the present invention discloses an apparatus for molding items with undercuts. The following figures show embodiments of a molding method and apparatus that advantageously can form aggressive undercuts at high speed, low cost, and within limited space.

Figure 1:
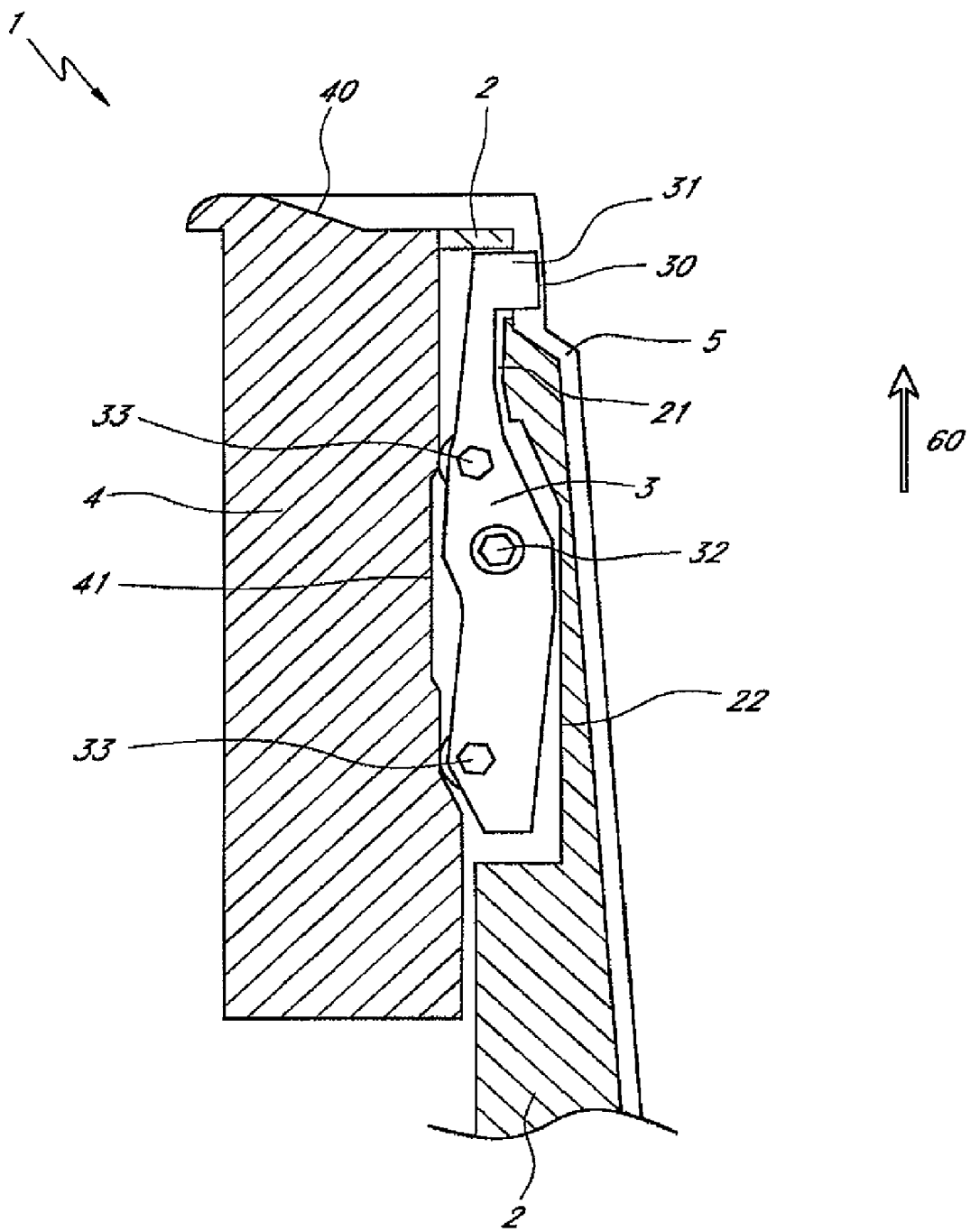
FIGS. 1-3 are slice cross-sections of a molding apparatus in a "closed," "open," and "closed" position respectively.
Figure 2:
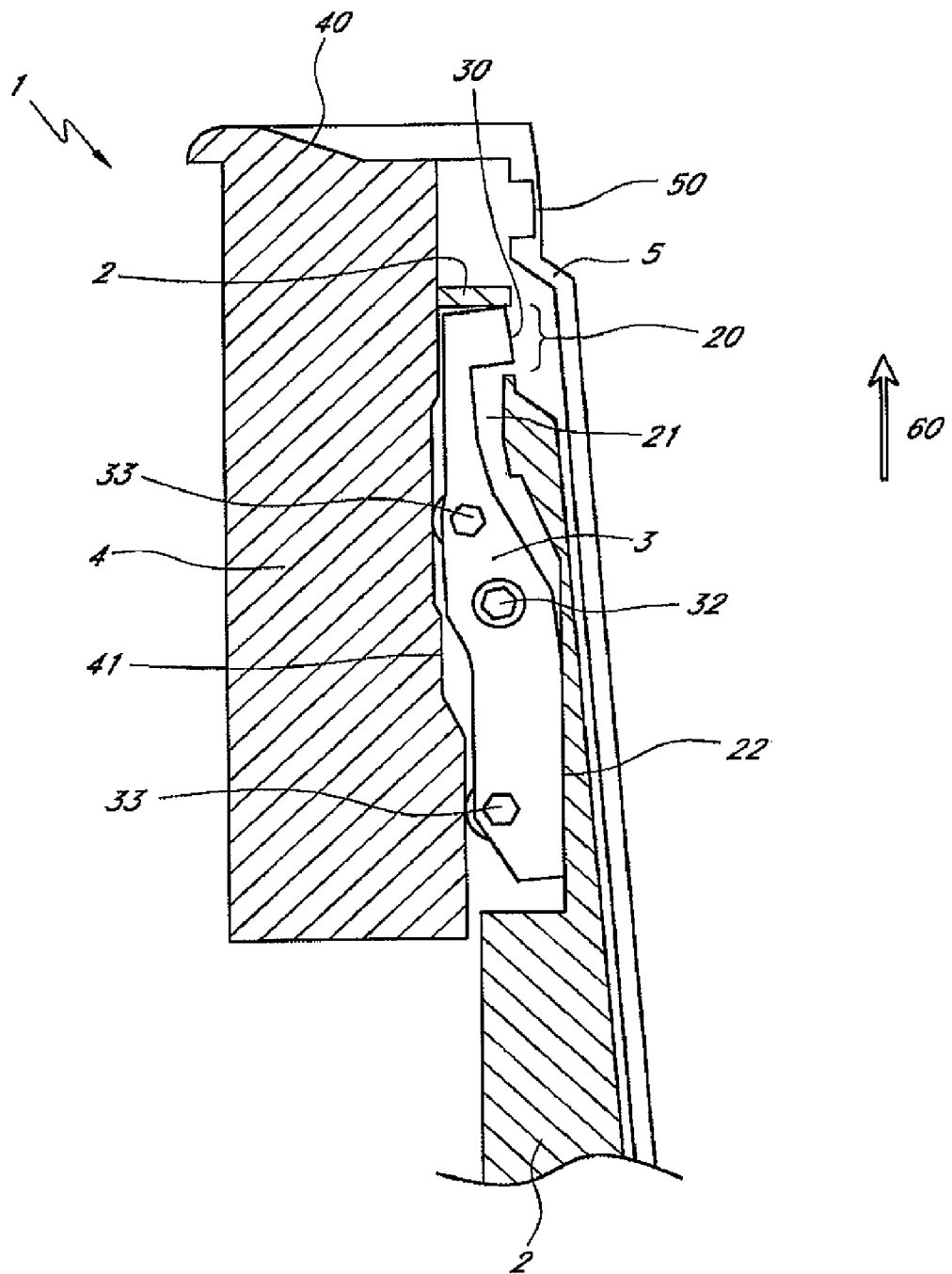

FIG. 1 shows a slice cross-sectional view of an embodiment of a molding apparatus 1 in "closed" position, and FIG. 2 shows a slice cross-sectional view of the same embodiment in an "open" position. These slice cross-sectional views depict a portion of a molding apparatus, with sections taken along two parallel planes, depicted by lines I, II in FIGS. 4, 7 to form a the illustrated "slice," A primary mold 2 can be configured to define the majority of the outer surface of the item to be formed 5. The primary mold 2 can be configured to define almost any portion of the surface of an item to be molded. The primary mold 2 can comprise a shaped surface configured to receive moldable material. In the illustrated embodiment, the primary mold 2 defines at least one hole 20. The hole 20 is illustrated in FIG. 2, after a molding surface 30 of a swinging member 3 has pivoted back and no longer fills the portion of the whole shown. The primary mold 2 may also comprise other holes (not shown in FIGS. 1 and 2) that can allow insertion of material to be molded, although the hole 20 can, in some embodiments, provide that function as well. The hole 20 need not be closed, and thus may be an opening resembling a "U" shape when seen from the side wherein the hole 20 opens upward at the edge of the primary mold 2. Generally, the hole 20 may comprise many shapes desirable for molding and is not limited to the specific examples presented here. The hole can also allow for the escape or insertion of gas during the molding process, so as to draw or suck molding material into the primary mold, or to force or blow a molded product out of the primary mold.

The primary mold 2 can be manufactured from some combination of the following materials: plastics, metals, ceramics, or other rigid or semi-rigid materials capable of maintaining their structural integrity throughout the molding process. The material to be molded can comprise polystyrene, polypropylene, polyethylene, terephthalate, polylactide, polyvinyl chloride, other plastics, other thermoplastic polymers, other polyester polymers, other biodegradable and/or compostable rigid polymers, or any other moldable material or combination thereof. The material to be molded can come in a variety of forms including, for example, a fluid to solidify around a mold or a sheet or mass of material to be compelled into the desired form. A sheet or mass of material can be physically urged into the desired form by gravity, positive pressure (e.g., pushing, blowing), negative pressure (e.g., pulling, sucking), etc.

The primary mold 2 may comprise one piece or a plurality of pieces. For example, the primary mold 2 may comprise an external section for defining the external surface of the item to be molded 5, and an internal section for defining the internal surface of the item to be molded 5. By placing these sections in proximity, the desired item can be formed. For some item geometries, a plurality of primary mold pieces may be necessary. For convenience, only outer portions of primary mold 2 are shown in the accompanying figures.

In some embodiments, the section of the primary mold 2 defining the hole 20 creates a substantially tight seal in combination with the other molding apparatus elements when in the "closed" position. In the absence of a substantial seal, there is a possibility that molding material may enter the internal portions of the molding apparatus 1 and solidify. Thus, a seal can be especially useful if intricate moving parts are present. Similarly, if the interior of the molding apparatus 1 comprises a lubricant or some other fluid, a substantial seal may be desirable to prevent said fluid from contaminating the molding material. Creating a substantial seal may be accomplished using compressible materials, precise dimensioning at the border of the hole 20, or an additional sealing element, for example.

In some embodiments, the primary mold 2 comprises a thickness and material strength sufficient to bear loads caused during the molding process and provide attachment points for other elements of the molding apparatus 1 such as the swinging member 3. Similarly, the primary mold 2 may comprise surfaces and members designed to interface with and reduce friction between other elements of the molding apparatus during the motion of the molding apparatus 1.

Adjacent to the primary mold 2 is at least one swinging member 3. The swinging member comprises at least one molding surface 30. In some embodiments, the molding surface 30 comprises the same material as the primary mold 2 and is shaped to substantially match the hole 20 defined by the primary mold 2 so that when passing through the hole 20 a seal is created. As illustrated, the swinging member 3 can comprise a neck portion 31 adjacent to the molding surface 30, also shaped to fit through the hole 20 defined by the primary mold 2. The neck 31 and corresponding hole 20 can comprise a conical shape, narrowing toward the molding surface 30 and hole 20, such that the neck 31 can press against the primary mold 2 evenly and create a complete seal when in the "closed" position. Other methods could be used to create a seal, including non-conical wedge shapes, compressible materials, precisely interlocking pieces, and combinations thereof. The seal created can separate internal moving parts from the molding material so as to improve reliability and reduce maintenance problems.

In some embodiments, a seal is not formed when the molding surface 30 is positioned within the hole 20. For example, a seal is not necessary when a more viscous molding material—that will not seep past the swinging member 3—is used. In such instances, embodiments with greater clearance between the hole 20 and the neck 31 may be preferable. Such clearance may be desirable in embodiments where the swinging member 3 does not move straight through the hole 20, and the additional clearance for movement between the "open" and "closed" positions may be useful. In some embodiments, a gap 21 between the neck 31 and the sides of the hole 20 may be advantageous to allow gas to escape from within the mold when the material that eventually forms the molded item 5 is conformed to the mold.

In other instances, the swinging member 3 can comprise an extension portion capable of extending through the hole 20 of the primary mold 2. When extending through, the extension portion of the swinging member 3 and the hole 20 can leave a gap 21 through which molding material and/or gas can pass through.

In the illustrated embodiment of FIG. 1 and FIG. 2, the swinging member 3 is connected to the primary mold 2 at a pivot 32. The pivot 32 can comprise an axle, bearings, bushings, etc., or some other element or combination of elements allowing pivot motion. The swinging member 3 is thus allowed to pivot between the "open" position of FIG. 1 and the "closed" position of FIG. 2.

Additionally, in the illustrated embodiment, the motion of the swinging member 3 is limited by a non-molding receiving surfaces 22 of the primary mold 2. The receiving surface 22 can be associated with an "open" orientation as depicted in FIG. 2, preventing the swinging member from rotating further. This restraint can be redundant with the receiving surface 41, but still provides increased rigidity and reliability. In the "closed" orientation, the molding surface 30 protrudes through the hole 20 and into an "undercut" portion of the molded item 5 such that the molded item 5 cannot be removed from the molding apparatus 1 by moving the molded item 5 in the direction of the arrow 60. By contrast, in the "open" orientation of FIG. 2, the swinging member 3 has pivoted such that the molding surface 30 is withdrawn so as not to protrude through the hole 20, allowing removal of the molded item 5 by moving it in the direction of the arrow 60.

In the illustrated embodiment, movement between the "closed" and "open" orientation can be directly caused by the motion of a stripper 4 relative to the primary mold 2. The stripper 4 can be located adjacent to the primary mold 2 and comprises a stripping surface 40 and a receiving surface 41. The stripping surface 40 is positioned and designed to facilitate removal of the molded item 5 when the stripper 4 moves relative to the primary mold 2. For example, the stripper 4 can be moved in the direction of the arrow 60. Movement of the stripper 4 imparts a force in the direction of the arrow 60 on the molded item 5 at the stripping surface 40 which can overcome any adhesion to the primary mold 2, thus removing the molded item 5 from the primary mold 2. Similarly, the stripper 4 can be deployed in a position removing the molded item 5 from the primary mold 2 at some times, and at other times in a non-deployed position where the stripper 4 does not remove the molded item 5 from the primary mold 2.

At the same time as the stripper 4 is pushing up on the molded item 5, the contours of the stripper 4 cause the swinging member to disengage from the molded item 5. The receiving surface 41 of the stripper 4 is shaped so as to exert a force on the swinging member 3 during movement of the stripper 4. As the stripper 4 moves in the direction of the arrow 60, the swinging member 3 rotates into the "open" position. The molding surface 30 is thus withdrawn and does not protrude through the hole 20. This allows the molded item 5 to be removed from the molding apparatus 1 without interference from the swinging member 3. Then, as the stripper 4 moves back relative to the primary mold 2 after the molded item 5 has been removed, the swinging member 3 can rotate back into the "closed" position. The molding surface 30 then protrudes through the hole 20 in preparation for molding a new item 5. This motion of the swinging member 3 can be caused through a contact feature 33, in this embodiment depicted as bearings. The bearings 33 of the swinging member 3 roll along sloped portions of the receiving surface 41 of the stripper 4, and the motion of the swinging member 3 can be limited by the receiving surface 22, as shown in FIGS. 2-3.

The contact feature 33 of the swinging member 3 can comprise other forms in addition to bearings. For example, the contact feature 33 can comprise sliders, lubricated surfaces, low-friction materials, or any other feature allowing lateral movement in the presence of a normal force.

Some embodiments can include protruding portions of the receiving surface 41 instead of a recessed portion, providing equivalent forces on the swinging member 3. The receiving surface 22 may take any shape that will restrict the motion of the swinging member 3 appropriately. However, the receiving surfaces 22, 41 that partially correspond to the surface (e.g., the surface 41) of the swinging member 3 are preferable.

Figure 3:
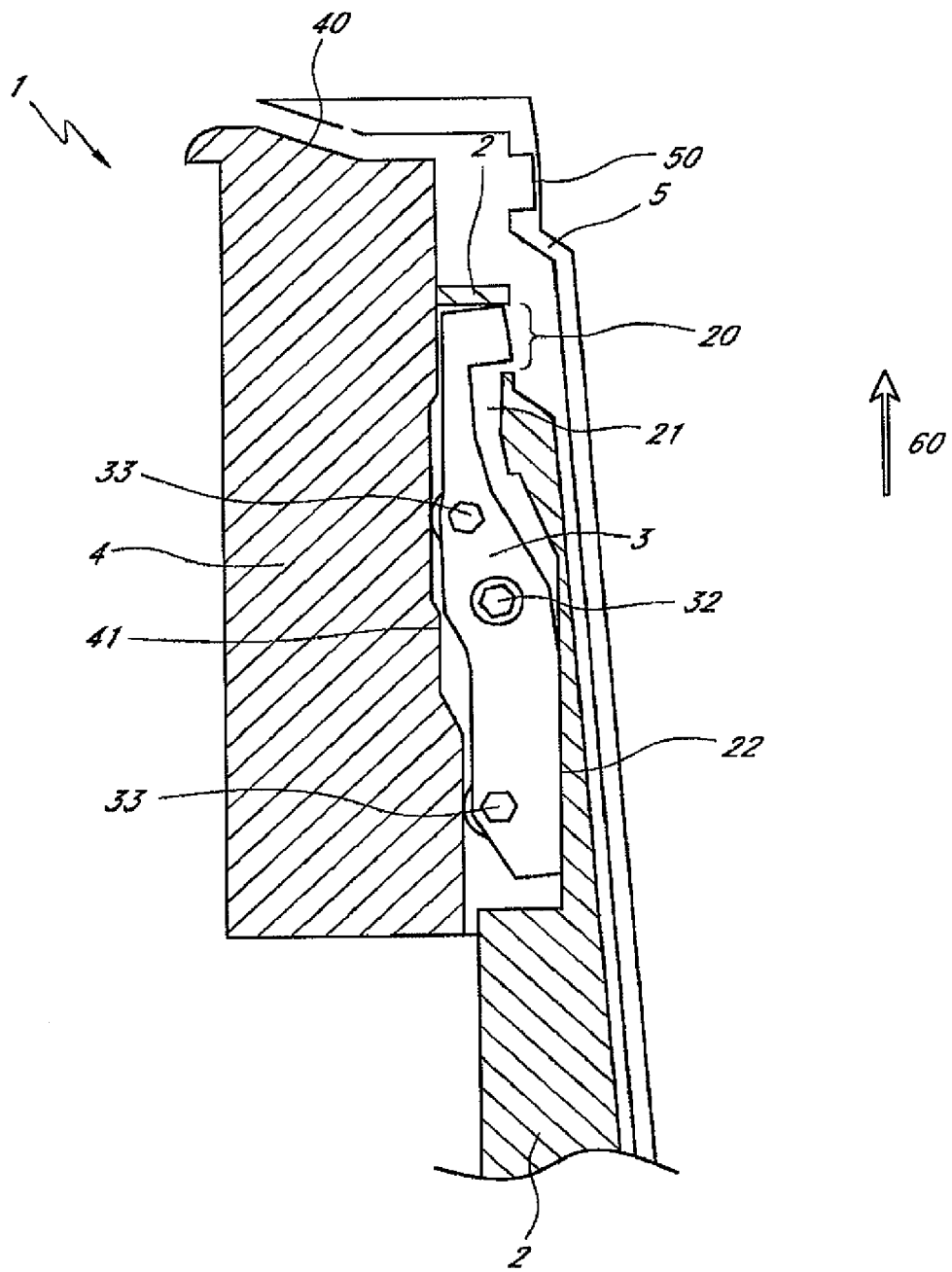

FIG. 3 shows a slice cross-section of the preferred embodiment of the molding apparatus 1 with the molded item 5 separated from the molding apparatus 1. Notably, the item 5 would be blocked from removal if the swinging member 3 were still engaged with the item 5 in the "closed" position illustrated in FIG. 1.

Figure 4:
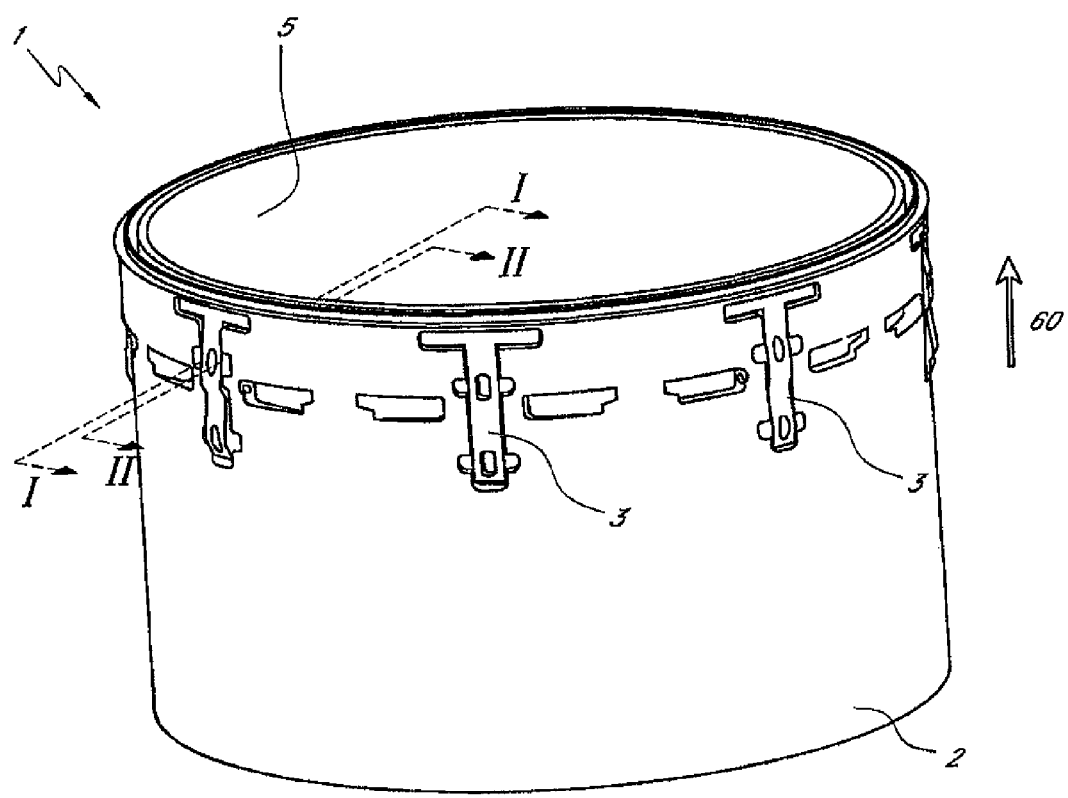
FIGS. 4-6 are perspective views of a molding apparatus in a "closed," "open," and "closed" position respectively.
Figure 5:
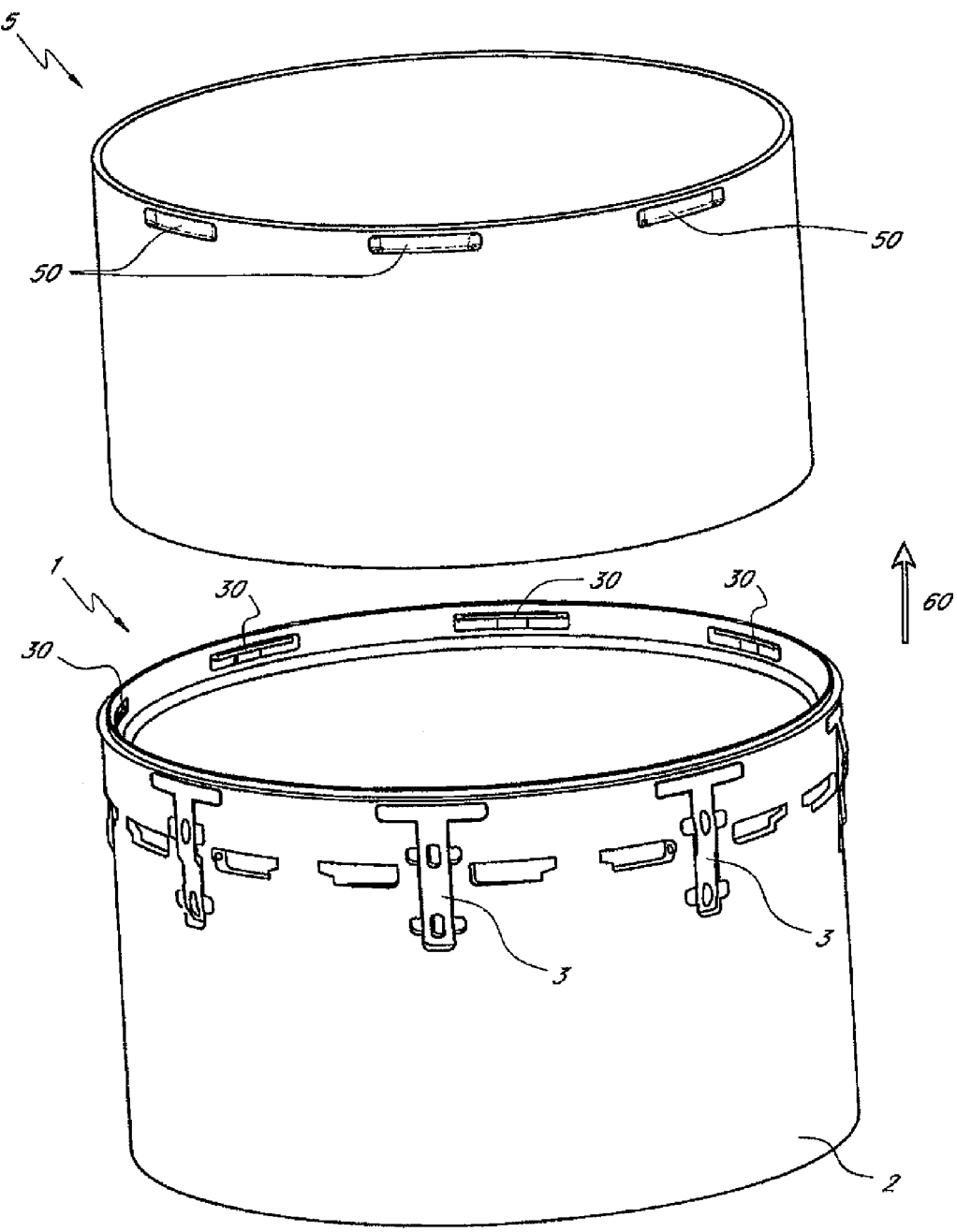
Figure 6:
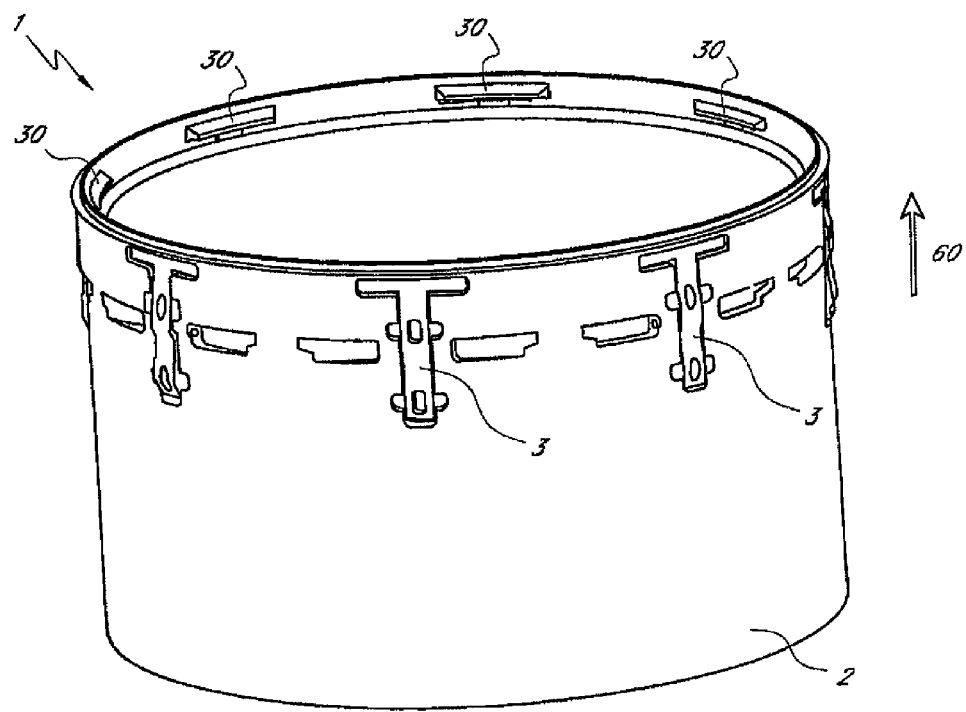

FIGS. 4-6 provide a perspective view of an embodiment of the molding apparatus 1 through successive stages of operation (the stripper 4 is not shown in these figures). In FIG. 4 the apparatus 1 is in the "closed" position with the molded material inserted. Once the mold material has hardened, the swinging member 3 can move to the "open" position, pulling back the molding surface 30 and allowing the molded item 5 to be removed, as depicted in FIG. 5. When the stripper 4 is present, movement of the swinging member 3 to the "open" position coincides with an upward motion of the stripper 4, which can assist in separating one or more surfaces of the molded item 5 from one or more surfaces of the primary mold 2. Then, the molded item 5 can be more easily pulled out, blown out, removed by suction, or removed by other methods known in the art.

In the illustrated embodiment, the motion of the stripper 4 and the swinging member 3 are mechanically connected, allowing removal of the molded item 5 through a single motion of the stripper 4 without concern that removal will be blocked by the molding surface 30. This avoids problems that may exist if movement of the stripper 4 occurs before the swinging member 3 has been withdrawn. Such problems can include damage to both the molded item 5 and the molding apparatus 1. Thus, the illustrated embodiments are advantageous in providing a simple and reliable mechanism for correlating the movement of the swinging member 3 and the splitter 4 such that the molded item 5 can be safely, reliably, and quickly removed. This mechanically-coupled system can be better than techniques that may require a separate mechanism for removing an undercutting member. The separate mechanism, which may require a more complicated, independent activation system, can add more cost, take up more space and time, and providing more ways in which the system can fail. A direct mechanical relationship between the movement of two pieces can be more reliable, in some embodiments, than an indirect relationship such as through electronic circuits.

In FIG. 6 the swinging member 3 has returned to the "closed" position, so new molding material can be inserted and a new item (e.g., an item such as the molded item 5) can be formed. The mechanical connection between the motion of the swinging member 3 and that of the stripper 4 can allow the molding apparatus 1 to return to the "closed" position quickly with only a single motion of the stripper 4.

Once the molded item 5 has been removed, new molding material can be inserted into the molding apparatus 1 to repeat the molding process. This material could be inserted by pouring, pressing, or other methods known in the art.

In other embodiments, the molding material can be inserted prior to returning to the "closed" position. For example, to simplify the surface of the primary mold 2 it may be desirable to insert the molding material through the hole 20. In such embodiments it may be advantageous to insert the molding material while in the "open" position, such that the swinging member 3 does not block a channel conveying the molding material. Once sufficient material has been inserted the swinging member 3 can move to the "closed" position, impeding the insertion of further material and defining the remaining surface of the molded item 5.

In some embodiments of the molding apparatus 1, a heat sink may be advantageous. Most molding materials dissipate heat as they set, generate heat as they cure, or both generate and dissipate heat. To increase the operating speed of a molding apparatus 1, it may be useful to quickly dissipate a substantial amount of heat. Therefore, in some embodiments, a heat sink comprising water, refrigerant, air, or some other substance or material can be provided. To enhance the rate of heat transfer, the molding apparatus 1 may fully or partially comprise materials with high thermal conductivities, or comprise geometries that enhance heat transfer such as cooling fins. To further enhance heat dissipation, the molding apparatus 1 can comprise a cooling apparatus such as a refrigerator. However, in other embodiments of this invention a special heat sink will not be necessary, such as embodiments operating at lower speeds or with cooler molding materials.

Figure 7:
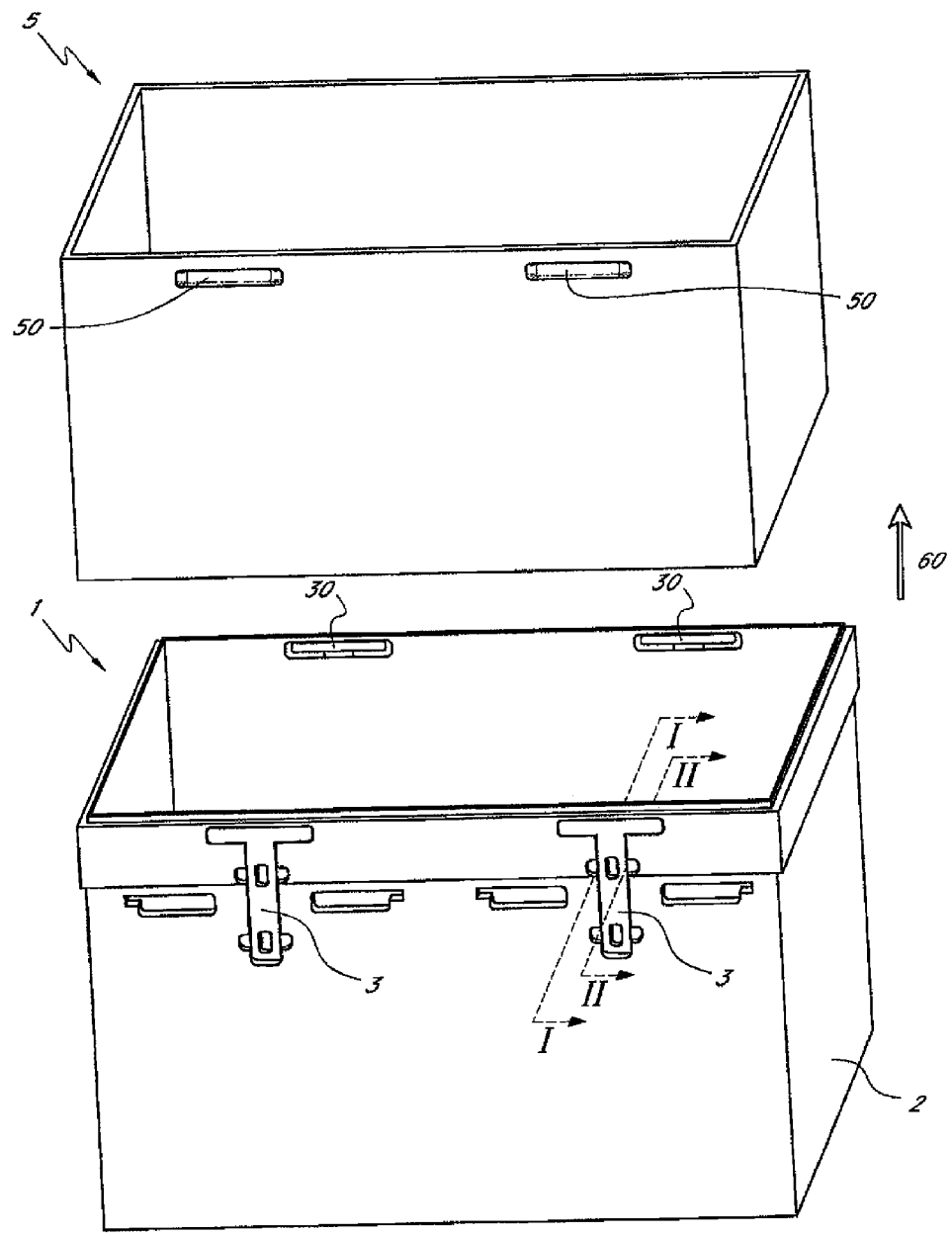
FIG. 7 is a perspective view of another embodiment of the invention.

In some embodiments, the molded item 5 is in the shape of a cylinder with undercuts 50 protruding inward. However, in other embodiments, the molded item 5 can be a box, as shown in FIG. 7, or other shapes. The figures show molded items 5 that are hollow and the variations formed by the swinging members 3 do not go completely through the molded item 5. However, the described inventions can also be used on non-hollow parts and the swinging members 3 can have portions that extend through portions of molded items. For example, some embodiments can be used to produce a solid rod with a radial hole, whereby the molding surface 30 protrudes through the entire diameter of the molded part. As another example, some embodiments can produce a hollow tube with a similar radial hole protruding through the entire diameter. The inclusion of multiple swinging members 3 and primary molds 2 comprising multiple pieces allows further variations of molded items 5 that can be created quickly and easily.

In some embodiments, a molding apparatus can be used to form the interior of a molded item. In such a case, similar undercuts can be produced that protrude outwards instead of inwards. This can be accomplished, for example, by installing a swinging member 3 and stripper 4 along the interior piece of a primary mold 2. In such an embodiment the molding surface 30 protrudes outward, and thus an undercut 50 protruding outwards can be formed.

In some embodiments, the molding surface 30 can be made large relative to the primary mold 2. In such an embodiment two large inwardly protruding undercuts 50 adjacent to one another can have an effect equivalent to one small outwardly protruding undercut 50.

Figure 8:
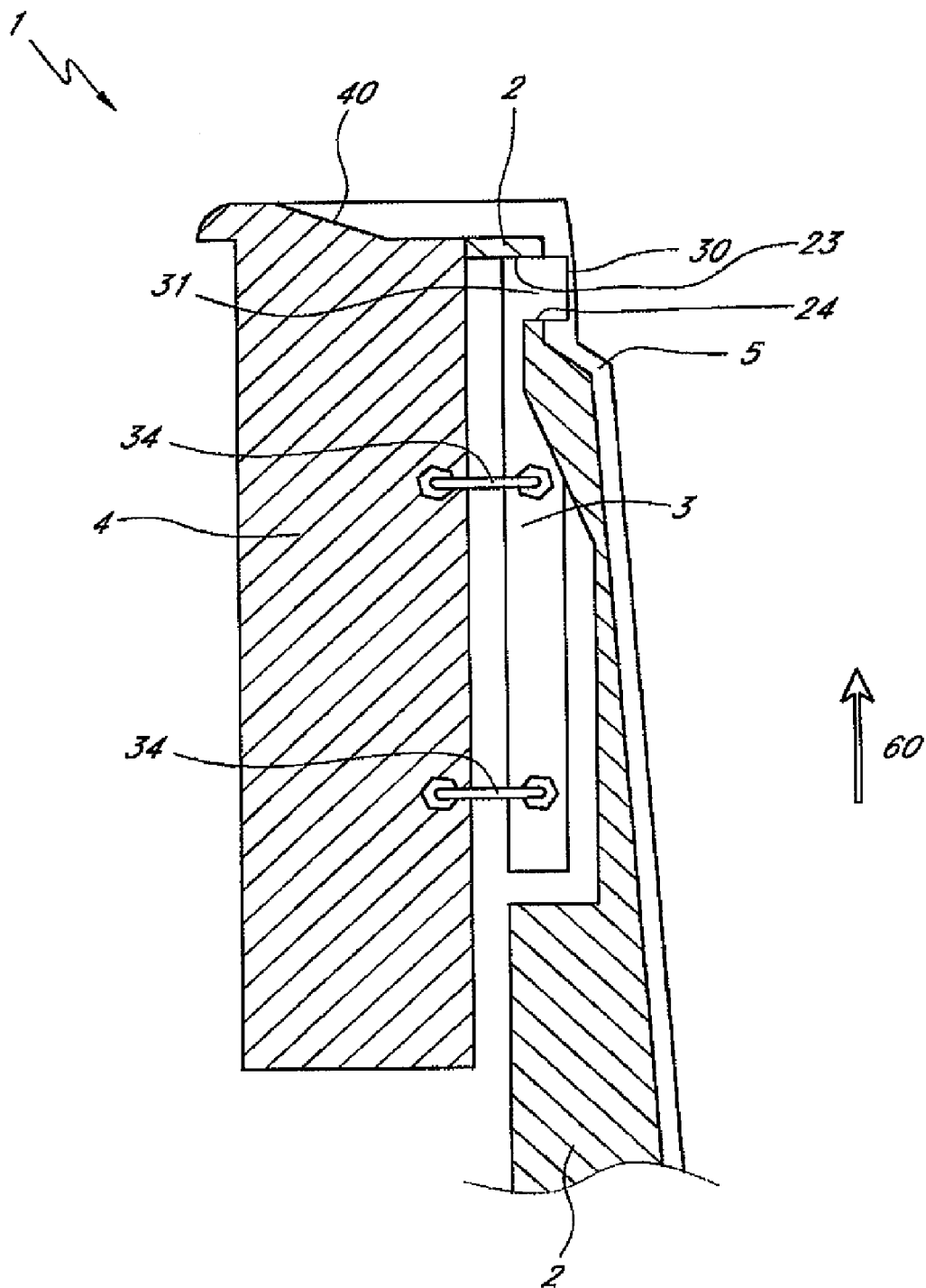
FIGS. 8, 9 are slice cross-sections of another embodiment of a molding apparatus in a "closed," and "open" position respectively.
Figure 9:
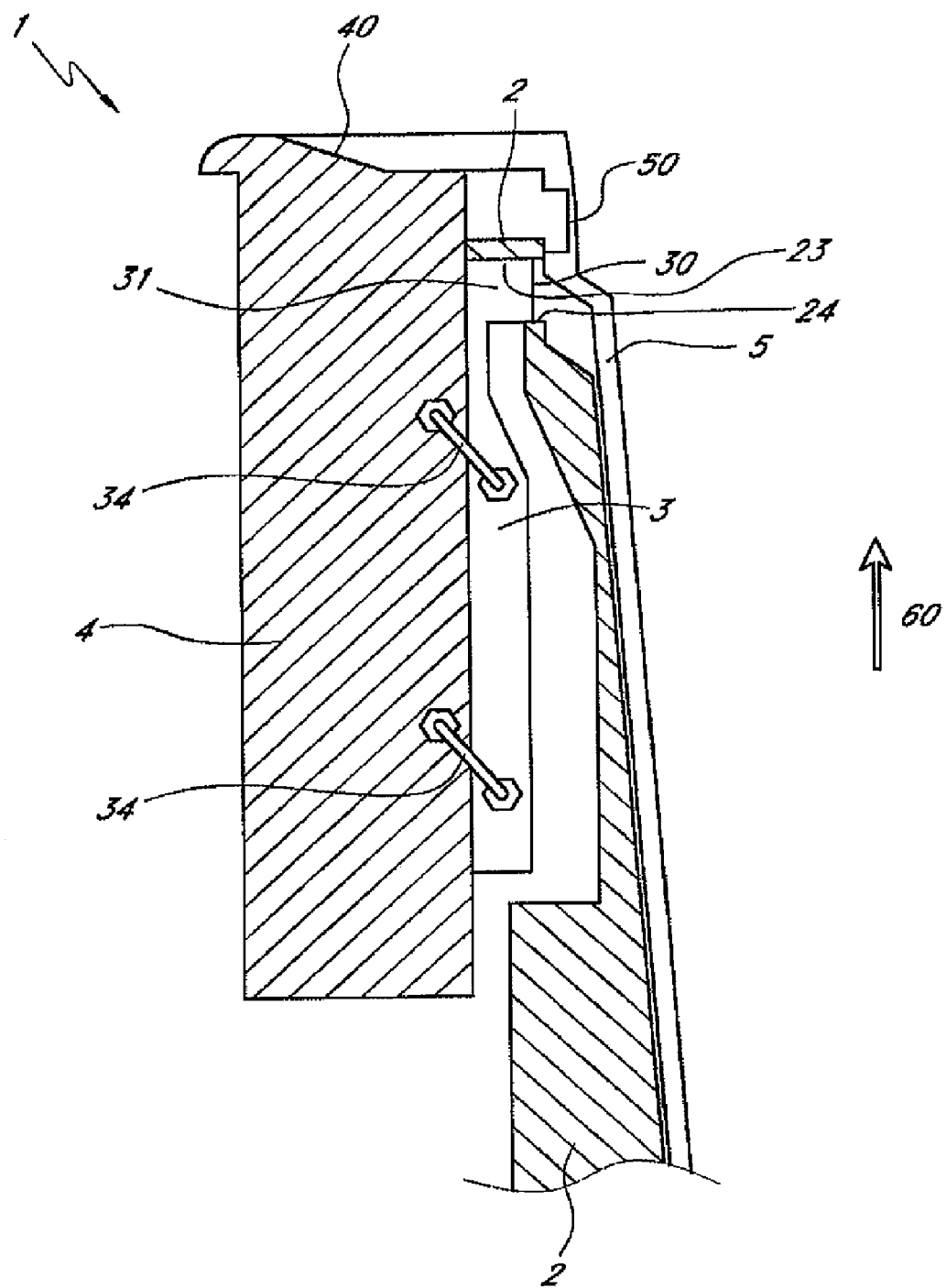

In some embodiments, the swinging member 3 can be attached to the stripper 4, as depicted in FIGS. 8-9. The swinging member 3 is attached to the stripper 4 by two bars 34, each able to pivot at each point of attachment. Further, the motion of the swinging member 3 is restrained by two receiving surfaces 23, 24 of the primary mold 2. As shown, the movement of the splitter 4 can then force the swinging member 3 between a "closed" position depicted in FIG. 8 and an "open" position depicted in FIG. 9. The receiving surfaces 23, 24 prevent the swinging member 3 from swinging freely, absent the corresponding motion of the stripper 4. Advantageously, either the swinging member 3 and/or the receiving surfaces 23, 24 can comprise a friction-reducing member such as bearings, lubricant, or special materials so as to facilitate the motion of the molding apparatus 1.

In the illustrated embodiment of FIGS. 8 and 9, the swinging member 3 generally moves in a direction perpendicular to the arrow 60, without a rotating or tilting motion as described with respect to the embodiment of FIGS. 1 and 2, for example. Thus, for example, if the primary mold 2 is held stationary and the stripper 4 is moved upwards, the mechanical forces caused by the system of bars 34 and the surfaces 23 and 24 result in lateral movement of the swinging member 3 toward the stripper 4. However, in some embodiments, the swinging member 3 can move in any path that allows it to move to and from a position where the molding surface 30 protrudes through the hole 20, and is not limited to straight, curved, or bent paths.

Altering the lengths and positions of the bars 34 connecting the swinging member 3 and the stripper 4 can change the motion of the swinging member 3. Generally, the positions and lengths of the bars 34 will be chosen so as to provide an optimal motion of the swinging member 3 through the hole 20 and in the space substantially between the stripper 4 and the primary mold 2.

Figure 10:
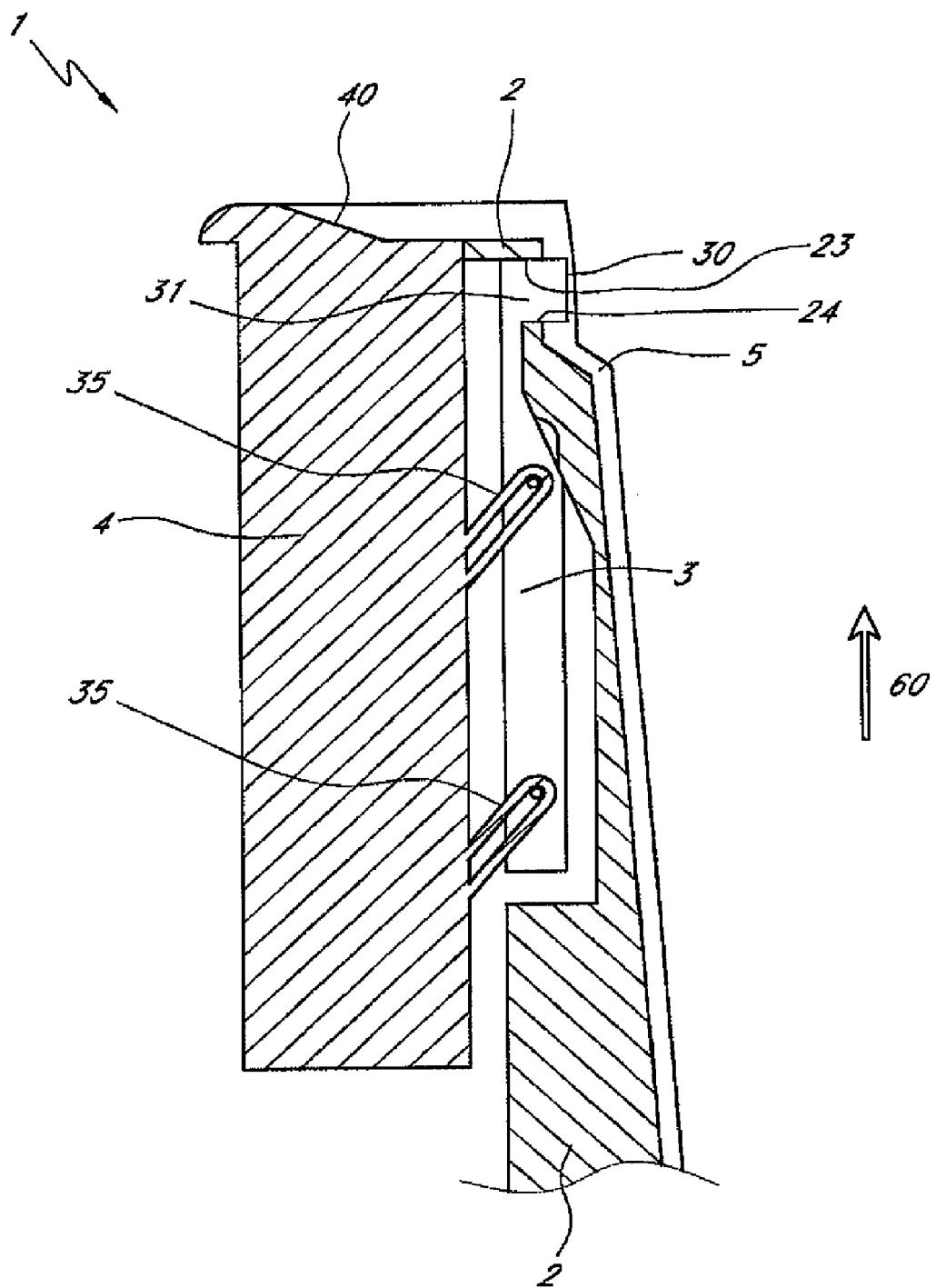
FIGS. 10, 11 are slice cross-sections of another embodiment of a molding apparatus in a "closed," and "open" position respectively.
Figure 11:
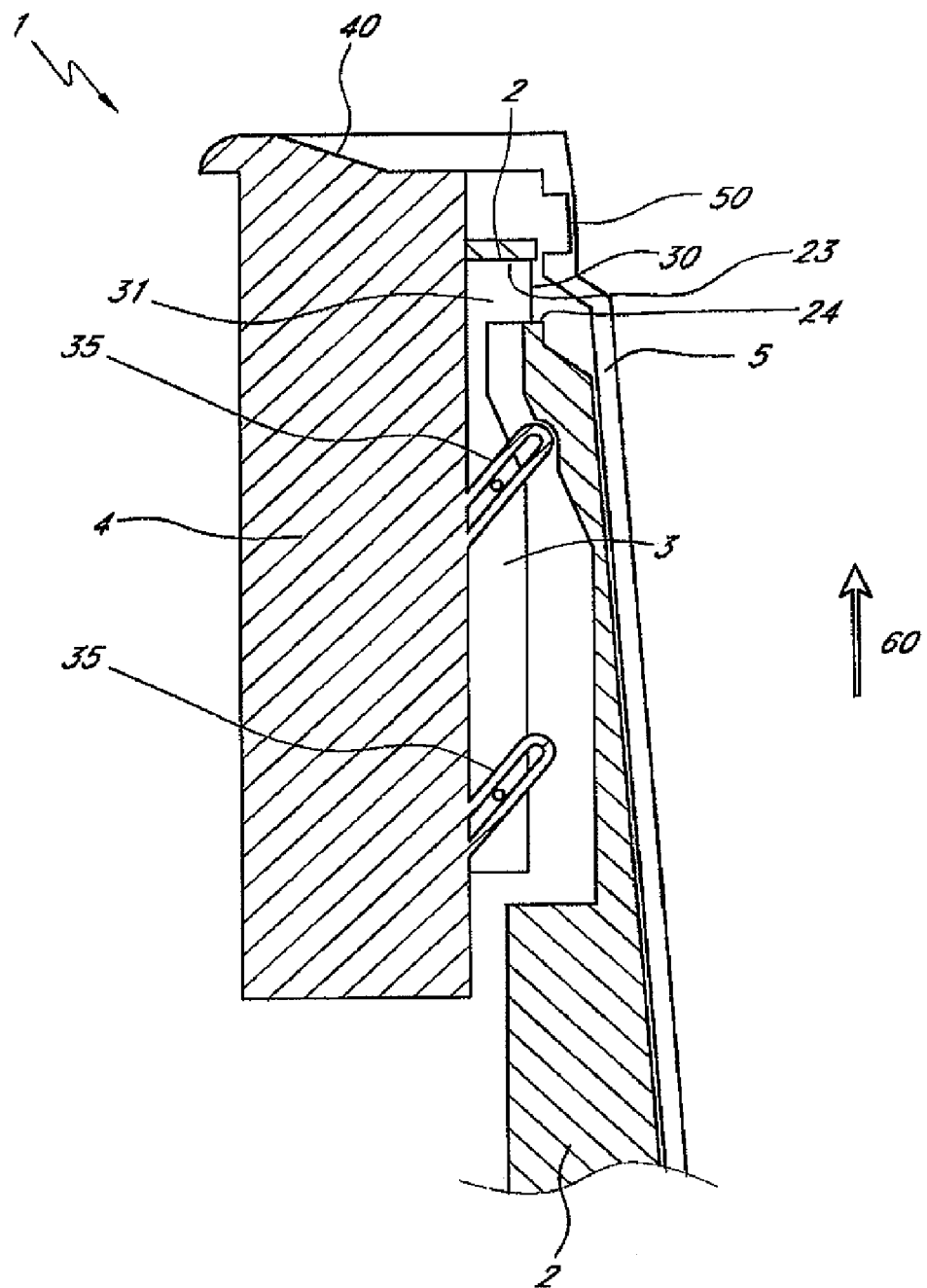

In another embodiment of the molding apparatus 1, the swinging member 3 can be attached to the stripper 4 as depicted in FIGS. 10, 11. The swinging member 3 is confined to move along two slides 35 which are attached to the stripper 4. As depicted, the slides 35 provide an angled path for the swinging member 3 relative to the stripper 4. Comparable functionality can also be achieved with a curved, bent, or alternatively-shaped path. As the stripper 4 moves relative to the primary mold 2 the swinging member 3 is forced to move backward, as depicted in FIGS. 10, 11. To prevent excessive friction at surfaces 23, 24 it may be desirable to include a friction-reducing member between the swinging member 3 and surfaces 23, 24.

The motion of the swinging member 3 in the embodiment of FIGS. 10, 11 can be fully restricted by only one slide 35 combined with the surfaces 23, 24. Nevertheless, a second slide 35 may be desirable to improve rigidity and reduce the load born by each individual moving part. For the same reason, more than two slides may be desirable, especially directly opposite the slides 35 so as to reduce deflection of a bar running through the swinging member 3 and both opposing slides.

As an alternative to both receiving surfaces 23, 24 of the primary mold, the motion of the swinging member 3 in FIGS. 8-11 can be restrained by at least one spring or other resisting piece so as to bias the swinging member 3 towards either the "open" and/or "closed" positions, along with a single receiving surface that prevents the swinging member 3 from moving too far under the force of the spring. When the spring biases the swinging member 3 toward the "closed" position, the resisting force from the spring can be overcome upon movement of the stripper 4 to the "open" position so the swinging member 3 can move to the "open" position as well. Then, movement of the stripper 4 to the "closed" position can allow the swinging member 3 to move back to the "closed" position. A similar effect can result if the spring biased the swinging member 3 toward the "open" position.

Providing a spring to bias the swinging member 3 toward an "open" and/or "closed" position can be advantageous in that the apparatus 1 then may require a minimum force to move the swinging member 3 between positions. For example, a stronger spring can require a stronger force to move the member between positions. Embodiments with strong springs will be less likely to undergo unintentional movements between positions, and thus may be more reliable in operation.

Other mechanisms can also be used to restrain the free motion of the swinging member 3 such as two opposed springs, torsion springs, coil springs, elastically deforming pieces, receiving surfaces, combinations thereof, or any other means known in the art. Additionally, external forces such as gravity and electromagnetic forces may be used to restrain and/or control the movement of the swinging member 3. The restraints are preferably sufficient to prevent undesirable free swinging of the swinging member 3. Such free-swinging may be of concern while the apparatus is in the "closed" position because a constant molding surface 30 is often desired. It will also often be desirable to restrain or moderate the motion of the swinging member 3 in the "open" position.

As illustrated in FIGS. 8-11 there is no gap 21 between the swinging member 3 and the hole 20. It will be clear that when such a gap 21 is desirable it could be provided.

In some embodiments of the invention, multiple items 5 can be formed with undercuts 50 (see FIG. 2) simultaneously. In this situation, the primary mold 2 can consist of multiple segregated sections, each with at least one associated swinging member 3, to form a separate molded item 5. All the swinging members 3 can be associated with a single stripper 4, such that movement of the single stripper 4 causes removal of all molded items 5. Similarly, some molded items 5 may not have associated swinging members 3, yet still be removed by the single stripper 4.

A set of items 5 molded together can additionally be formed from a single piece of molding material. For example, a single sheet of molding material can be provided over a plurality of molding apparatuses 1. They can all then be compelled into the molding apparatus 1 and molded while still maintaining their connections. The molded items 5 can then be cut into separate products from each other during the molding process, after the molding process, or after ejection from the molding apparatus 1.

Further combinations of the elements described herein are also capable of performing substantially the same function as those embodiments explicitly described. Such further combinations of the elements are also understood to comprise embodiments.

Reference throughout this specification to "some embodiments" or "an embodiment" means that a particular feature, structure or characteristic described in connection with the embodiment is included in at least some embodiments. Thus, appearances of the phrases "in some embodiments" or "in an embodiment" in various places throughout this specification are not necessarily all referring to the same embodiment. Furthermore, the particular features, structures or characteristics may be combined in any suitable manner, as would be apparent to one of ordinary skill in the art from this disclosure, in one or more embodiments.

In the above description of embodiments, various features of the inventions are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that any claim require more features than are expressly recited in that claim. Rather, inventive aspects lie in a combination of fewer than all features of any single foregoing disclosed embodiment.

Although the invention(s) presented herein have been disclosed in the context of certain preferred embodiments and examples, it will be understood by those skilled in the art that the invention(s) extend beyond the specifically disclosed embodiments to other alternative embodiments and/or uses of the invention(s) and obvious modifications and equivalents thereof. Thus, it is intended that the scope of the invention(s) herein disclosed should not be limited by the particular embodiments described above.

What is claimed is:

1. A method for molding undercuts, the method comprising:
    providing a molding apparatus including
        a primary mold configured to define a portion of a surface of a molded item, said primary mold defining at least one hole,
        a stripper alongside the primary mold, wherein the stripper comprises a stripping section and a receiving surface, and
        at least one swinging member coupled by at least one pivot to one of the primary mold or the stripper, wherein the swinging member comprises a molding surface and a contact feature;
    inserting molding material into the molding apparatus;
    allowing the molding material to set while the molding surface of the swinging member protrudes into the material to define an undercut portion of the surface of the molded item; and displacing the stripper to strip the molded item from the molding apparatus, whereby displacing of the stripper moves the swinging member relative the at least one pivot to move the molding surface of the swinging member out of engagement with the undercut portion of the surface of the molded item.

2. The method of claim 1, wherein displacing the stripper includes simultaneously withdrawing the molding surface of the swinging member and removing the molded item from the molding apparatus.

3. The method of claim 1, wherein inserting the molding material includes positioning the molding surface of the swinging member in engagement with the at least one hole.

4. The method of claim 1, wherein inserting the molding material includes positioning the molding surface of the swinging member out of engagement with the undercut portion of the surface of the molded item.

5. The method of claim 1, further comprising removing the molded item from the molding apparatus.

6. The method of claim 5, wherein removing the molded item from the molding apparatus comprises removing a set of products from the molding apparatus that have been formed from a single sheet of plastic, the method further comprising cutting the molded item to separate the products from each other.

7. The method of claim 5, wherein the method for molding undercuts is repeated a plurality of times.

8. The method of claim 5, wherein removing the molded item comprises providing a high pressure between the molded item and the molding apparatus.

9. The method of claim 1, wherein displacing the stripper directly causes movement of the molding surface of the swinging member.

10. The method of claim 1, further comprising contacting the receiving surface of the stripper with the contact feature of the swinging member to move the swinging member.

11. The method of claim 10, wherein contacting the receiving surface of the stripper includes rolling the contact feature of the swinging member on the receiving surface of the stripper.

12. The method of claim 10, wherein contacting the receiving surface of the stripper includes sliding the contact feature of the swinging member on the receiving surface of the stripper.

13. The method of claim 1, further including moving the stripper to a first position to move the swinging member into engagement with the at least one hole.

14. A method for molding undercuts, the method comprising:
providing a molding apparatus including
a primary mold configured to define a portion of a surface of a molded item, said primary mold defining at least one hole,
a stripper alongside the primary mold, wherein the stripper comprises a stripping section and a receiving surface, and
at least one swinging member coupled by at least one slide to one of the primary mold or the stripper, wherein the swinging member comprises a molding surface and a contact feature;
inserting molding material into the molding apparatus;
allowing the molding material to set while the molding surface of the swinging member protrudes into the material to define an undercut portion of the surface of the molded item; and
displacing the stripper to strip the molded item from the molding apparatus, whereby displacing of the stripper moves the swinging member relative the at least one slide to move the molding surface of the swinging member out of engagement with the undercut portion of the surface of the molded item.

15. The method of claim 14, wherein displacing the stripper includes simultaneously withdrawing the molding surface of the swinging member and removing the molded item from the molding apparatus.

16. The method of claim 14, wherein inserting the molding material includes positioning the molding surface of the swinging member in engagement with the at least one hole.

17. The method of claim 14, wherein inserting the molding material includes positioning the molding surface of the swinging member out of engagement with the undercut portion of the surface of the molded item.

18. The method of claim 14, further comprising removing the molded item from the molding apparatus.

19. The method of claim 18, wherein removing the molded item from the molding apparatus comprises removing a set of products from the molding apparatus that have been formed from a single sheet of plastic, the method further comprising cutting the molded item to separate the products from each other.

20. The method of claim 18, wherein the method for molding undercuts is repeated a plurality of times.

21. The method of claim 18, wherein removing the molded item comprises providing a high pressure between the molded item and the molding apparatus.

22. The method of claim 14, wherein displacing the stripper directly causes movement of the molding surface of the swinging member.

23. The method of claim 14, further including moving the stripper to a first position to move the swinging member into engagement with the at least one hole.

\* \* \* \* \*